United States Patent Office 2,836,613
Patented May 27, 1958

2,836,613
3,3'-(ALKYLENEDIOXY)DIPROPIONITRILES

Samuel Allen Heininger, Dayton, Ohio, assignor to Monsanto Chemical Company, St. Louis, Mo., a corporation of Delaware No Drawing. Application March 14, 1956
Serial No. 571,384

6 Claims. (Cl. 260—465.6)

This invention relates to new compounds which are of particular utility as functional fluids; and more particularly, to 3,3'-(alkenylenedioxy)dipropionitriles, and to methods of making the same.

The novel compounds of the invention are of the formula

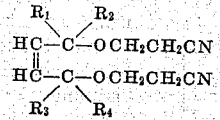

where $R_1$, $R_2$, $R_3$, and $R_4$ taken separately are selected from the class consisting of hydrogen and hydrocarbon radicals free of non-benzenoid unsaturation and containing from 1 to 16 carbon atoms, and where $R_1$ and $R_2$ taken together and $R_3$ and $R_4$ taken together represent, together with the carbon atom to which they are attached, a saturated carbocyclic radical containing from 5 to 10 carbon atoms. By non-benzenoid unsaturation is herein meant carbon to carbon, olefinic or acetylenic unsaturation.

It has been known hitherto to prepare saturated (alkylenedioxy)dipropionitriles, of the formula $$A-(OCH_2CH_2CN)_2$$

where A represents a saturated alkylene radical; however, these are relatively high-melting materials which differ in properties and utility from the present compounds. It has also been proposed to make dioxydipropionitriles from olefinic alcohols containing a conjugated system of double bonds; however, it is well known that compounds, like butadiene or like drying oils, which contain conjugated double bonds, are subject to oxygen-catalyzed polymerization, and, unlike the monoolefins which have an olefinic bond internally in a lengthy chain of atoms, rapidly polymerize and harden to resinous gums and oils. I have now found that the (butenylenedioxy)dipropionitriles of the above formula, containing a single vinylene group linked to two carbon atoms which are in turn linked to propionitrile radicals in the β-position through oxygen atoms, are stable compounds which have an unexpectedly wide range of fluidity. In contrast to the saturated homologs, the present olefinic ether nitriles possess very low freezing and pour points, and are of particular utility as functional fluids.

Actuating or functional fluids are widely used in industry as shock absorbers or as force applying means. Typical installations employing functional fluids are shock absorbers for the landing wheels of airplanes, dashpots for electrical switching apparatus, and power transmitting devices such as hydraulic rams, fluid drives in automobiles, aircraft hydraulic power systems, etc. Particularly in systems installed in vehicles such as airplanes and automobiles, it is important that the hydraulic fluids be adapted to function effectively over a wide temperature range, remaining fluid down to temperatures of —40° F. and below, and having a fairly flat viscosity/temperature curve over this range. If, for example, a liquid freezes and hardens at relatively high temperatures, e. g., above —30° F., it is then no longer able to function properly as a hydraulic fluid in many applications. It is accordingly a desideratum of researchers to provide stable liquids having a wide temperature range over which they are fluid.

In accordance with the present invention, there are provided novel (alkenylenedioxy)dipropionitriles which are fluid over a wide temperature range, in some instances down to —70° F. and below, which have good viscosity/temperature characteristics, and are highly suitable for employment as functional fluids in hydraulic systems exposed to wide variations in operating temperatures.

Where all the R's in the above formula for the compounds of this invention represent hydrogen, or where at least $R_1$ and $R_3$ represent hydrogen, the novel compounds of the invention may be prepared directly by addition of acrylonitrile to 2-butene-1,4-diol or a 1,4-substituted 2-butenediol, as illustrated by the following equation:

Eq. 1

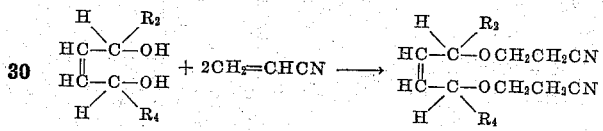

where $R_2$ and $R_4$ are selected from the class consisting of hydrogen and hydrocarbon radicals free of non-benzenoid unsaturation and containing from 1 to 16 carbon atoms. 1,4-substituted 2-butenediols are readily available by the addition of 2 moles of an aldehyde to 1 mole of acetylene, forming a butynediol which may be subsequently reduced to the corresponding olefinic dihydric alcohol by known processes. The radicals designated by $R_2$ and $R_4$ in the above formula may be the same or different. Particularly preferred in the present process are 1,4-alkyl-substituted 2-butenediols such as 2-pentene-1,4-diol, 3-hexene-2,5-diol, 3-heptene-2,5-diol, 4-octene-3,6-diol, 2,7-dimethyl-4-octene-3,6-diol, 5-decene-4,7-diol, etc. Mixed and branched chain alkyl radicals may be present in the diols used in the present process; thus, e. g., a diol which may be added to two equivalents of acrylonitrile in accordance with this invention may be synthesized by addition to acetylene of a $C_{13}$ aldehyde prepared from tetrapropylene by the Oxo process, followed by reduction, to produce a $C_{28}$ alcohol which may be designated as 1,4-didodecyl-2-butene-1,4-diol. Similarly, by the Oxo reaction, tri- or tetraisobutylene may be converted to an aldehyde which is condensed with acetylene in the ratio of 2 moles of aldehyde to 1 mole of acetylene to give an acetylenic diol which, after reduction to the corresponding olefinic dihydric alcohol, may be reacted with acrylonitrile to produce novel ethers in accordance with this invention.

The presently useful olefinic diols also include those containing cyclic radicals, such as aryl and aralkyl radicals, e. g., 1,4-diphenyl-2-butene-1,4-diol, 1,4-di-p-tolyl-2-butene-1,4-diol, 1,4-di-α-naphthyl-2-butene-1,4-diol and, 1,6-diphenyl-3-hexene-2,5-diol; and cycloalkyl radicals, such as 1,4-dicyclohexyl-2-butene-1,4-diol, etc.

When both of $R_1$ and $R_2$, both of $R_3$ and $R_4$, or all of the R's in the formulae of the novel compounds of this invention given above represent hydrocarbon radicals, the compounds of the invention are derivatives of tertiary alkenylenediols. It is known, however, that tertiary alcohols are refractory to the addition of acrylonitrile (R. Adams et al., eds., "Organic Reactions," vol. 5, p. 89; New York, Wiley, 1949). I have now made the discovery that tertiary dihydric alcohols are readily condensed with acrylonitrile in good yields when both tertiary carbinol carbon atoms are alpha to an acetylenic triple bonded carbon atom. The resulting (alkynylenedioxy)dipropionitriles may then be reduced to the corresponding olefinic and saturated ether nitriles containing tertiary carbon atoms alpha to the ether oxy atoms thereof. This method of synthesis of hitherto unknown ether nitriles derived from tertiary dihydric alcohols and the new acetylenic ethers formed thereby are the subject of my copending application, S. N. 571,382, filed of even date herewith and assigned to the same assignee as the present invention.

Accordingly, for the synthesis of the compounds of the invention wherein both the substituents on a single carbon atom represented by R in the above formula are hydrocarbon radicals, I employ a two-step reaction, the condensation of acrylonitrile with a tertiary alkynylenediol being followed by hydrogenation to reduce the resulting acetylenic ether nitrile to an olefinic ether as represented by the following equation:

Eq. II

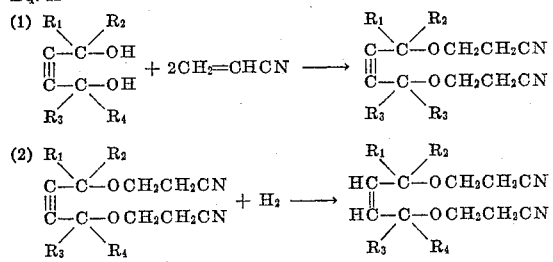

Examples of butynediols which may be condensed with acrylonitrile to give acetylenic nitriles amenable to subsequent selective hydrogenation to form the olefinic nitriles of the present invention are, e. g., alkyl-substituted butynediols such as 2,5-dimethyl-3-hexyne-2,5-diol, 3,6-dimethyl-4-octyne-3,6-diol, 2,3,6,7-tetramethyl-4-octyne-3,6-diol, 2,2,3,6,7,7-hexamethyl-4-octyne-3,6-diol, 4,7-di-n-propyl-5-decyne-4,7-diol, 2,4,7,9-tetramethyl-5-decyne-4,7-diol, etc.

By condensation of a cycloalkanone with acetylene, there are formed diols wherein the two radicals on a single carbon atom designated R in the above formula taken together represent the residue of a cyclic radical, such as 1,1'-ethynylenedicyclohexanol:

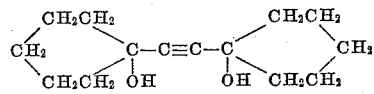

These tertiary acetylenic diols, wherein the carbocyclic radicals contain from 5 to 10 carbon atoms and are saturated, such as the above-depicted structure, 2,2'-dimethyl-1,1'-ethynylenedicyclohexanol, 1,1'-ethynylenedicyclopentanol, 1,1'-ethynylenedioctahydronaphthol, etc., may also be reacted with acrylonitrile in accordance with the present invention. Other presently useful tertiary diols containing a cyclic structure include aryl-substituted tertiary dihydric alcohols such as 2,5-diphenyl-3-hexyne-2,5-diol, 1,1,4,4-tetraphenyl-2-butyne-1,4-diol, 4,7-diphenyl-5-decyne-4,7-diol, etc.

Obviously, if desired, any acetylenic diol containing a secondary carbinol atom, instead of tertiary carbinol carbon atoms, may also be employed in the present process, i. e., be reacted with acrylonitrile and subsequently reduced. For example, a half-secondary, half-tertiary diol such as 3-(1-hydroxycyclohexyl)-2-propyn-1-ol may be condensed with acrylonitrile to give an acetylenic dipropionitrile which may be subsequently reduced to an olefin of the formula

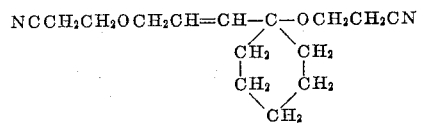

Similarly, for any of the above-listed secondary olefinic diols, there may be substituted the corresponding acetylenic diol, which, after addition of acrylonitrile to form the dioxydipropionitrile, may be subsequently reduced to the same olefinic ether nitrile as is obtained directly by reaction of the olefinic diol with acrylonitrile in accordance with this invention.

The products of the present reaction are olefinic ether nitriles. Thus, for example, from the reaction of 2-butenediol and acrylonitrile, there may be obtained 3,3'-(2-butenylene-1,4-dioxy)dipropionitrile. By the addition of acrylonitrile to olefinic secondary dihydric alcohols wherein alkyl radicals are attached to the carbinol carbon atoms are obtained, for example, 3,3'-(3-hexenylene-2,5-dioxy)dipropionitrile, 3,3'-(3-heptenylene-2,5-dioxy)dipropionitrile, 3,3'-(4-octenylene-3,6-dioxy)dipropionitrile, 3,3'-(2,7-dimethyl-4-octenylene-3,6-dioxy)dipropionitrile, 3,3'-(5-decenylene-4,7-dioxy)dipropionitrile, 3,3' - (1,4 - didodecyl - 2 - butenylene - 1,4 - dioxy)dipropionitrile, 3,3'-(1,4-dihexadecyl-2-butenylene-1,4-dioxy)dipropionitrile, etc. Olefinic secondary alcohols of the formula shown in Equation 1, wherein one or both of the $R_2$ and $R_4$ radicals are or contain cyclic radicals, on reaction with acrylonitrile in accordance with the process of the invention afford, e. g., 3,3'-(1,4-diphenyl-2-butenylene-1,4-dioxy)dipropionitrile, 3,3'-(1,4 - di - o-tolyl-2-butenylene-1,4-dioxy)dipropionitrile, 3,3'-(1,6-diphenyl-3-hexenylene-2,5-dioxy)dipropionitrile, 3,3'-(1,4-dicyclohexyl-2-butenylene-1,4-dioxy)dipropionitrile, etc.

Tertiary diols, after addition of acrylonitrile and subsequent reduction to the corresponding olefin give, for example, by the reaction of alkyl-substituted butynediols, such products of the formula of the invention as 3,3'-2,5-dimethyl-3-hexenylene-2,5-dioxy)dipropionitrile, 3,3'-(3,6-dimethyl-4-octenylene-3,6-dioxy)dipropionitriles, 3,3' - (2,3,6,7 - tetramethyl - 4 - octenylene - 3,6 - dioxy)dipropionitrile, 3,3'-(4,7-di-n-propyl-5-decenylene-4,7-dioxy)dipropionitrile, etc. Exemplary of the cyclic tertiary diol products of the invention wherein the two R's on each carbinol carbon atom taken together represent the residue of a cycloalkane ring of from 5 to 10 carbon atoms is 3,3'-(1,1'-vinylenedicyclohexyloxy)dipropionitrile of the structure

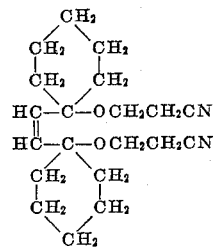

Reaction of 1,4-diarylbutynediols containing tertiary carbinol carbon atoms with acrylonitrile, followed by reduction to the corresponding olefinic ethers, gives, for example, 3,3'-(2,5-di-phenyl-3-hexenylene-2,5-dioxy)dipropionitrile, 3,3' - (1,1,4,4 - tetra - p - tolyl - 2 - butenylenedioxy)dipropionitrile etc.

It will be appreciated by those skilled in the art that the present novel compounds may contain asymmetric carbon atoms (the carbon atom intermediate between the oxy oxygen atom and the vinyl carbon atom) and are thus susceptible of existing as various optical isomers. Furthermore, by virtue of the rigid double bonds in these olefins, they may possess geometrical isomerism, the cis form being especially preferably formed in the catalytic reduction of the acetylenic precursors of the present nitriles. All the stereoisomeric forms of the new olefinic ether nitriles are contemplated as coming within the scope of this invention.

In carrying out the synthesis of the present novel 3,3'-(alkenylenedioxy)dipropionitriles, acrylonitrile is simply contacted with the chosen diol until formation of the dicyanoethylation product has occurred. In accordance with the stoichiometry of the equations shown above for this reaction, acrylonitrile should be present in approximately twice the molar amount of diol used, and preferably somewhat excess acrylonitrile is used, to serve as a reaction diluent and to produce more complete reaction of the diol. The reaction may be carried out in the presence or absence of an inert solvent or diluent; examples of presently useful solvents are, e. g., halogen compounds such as carbon tetrachloride, chloroform, ethylene dichloride, etc.; nitrogen compounds such as acetonitrile, dimethylformamide, etc.; oxygen compounds such as ethyl ether, isopropyl ether, dioxane, etc.; and hydrocarbons such as benzene, hexane, etc. Advantageously, a catalyst is used to accelerate the reaction. In the present addition of acrylonitrile to an alcohol compound, I prefer to use alkaline catalysts. Exemplary of presently useful alkaline catalysts are inorganic bases such as sodium hydroxide, sodium bicarbonate, potassium carbonate, etc.; and organic bases such as pyridine or triethylamine; quaternary ammonium salts such as choline or the tetraalkyl ammonium hydroxide sold commercially as Triton B; sodium alkoxides such as sodium methylate, etc. Alkali metals such as sodium, sodium-lithium, etc., are also useful catalysts for the present reaction. When the temperature of the reaction is kept low, the presence of a polymerization inhibitor is not necessary, but one may be used if desired. It is advisable to use such inhibitors when the temperature of the reaction is allowed to rise rapidly as when, for example, it is desired to accelerate and complete the reaction in a short time. Useful inhibitors include trinitrotoluene, selenium dioxide, hydroquinone, hydroquinone monomethyl ether, methylene blue, copper, copper carbonate, p-hydroxydiphenylamine, etc. Conveniently, the reaction is carried out at the reflux temperature of the mixture. By pressure variation, the reflux temperature of the reaction mixture may be varied to accelerate or diminish the reaction rate. For isolation of the products, the reaction mixture is worked up in any convenient manner, as by distillation, after neutralization of the catalyst, or by extraction, precipitation, etc.

In accordance with the present process, the ether nitriles which are the product of condensation of acrylonitrile with an acetylenic diol are subsequently selectively hydrogenated to the corresponding olefinic ether nitriles. Conditions for the selective hydrogenation of acetylenic bonds to olefinic bonds are known in the art and are described, for example, in R. A. Raphael, "Acetylenic Compounds in Organic Synthesis," p. 22 ff. (New York, Academy Press, 1955); and in C. Weygand, "Organic Preparations," p. 29–32 (New York, Interscience, 1945). While the reduction of acetylenic bonds to olefinic bonds can be accomplished by chemical or electrolytic means, I prefer to carry out the reduction catalytically. Usual catalysts for the selective hydrogenation of acetylenic bonds to olefinic bonds include, e. g., palladium, nickel and cobalt. Preferably, these catalysts are distributed on a substrate such as carbon or on an alkaline earth substrate. Thus, for example, a solution of palladium chloride in methanol is shaken with charcoal and reduced in a hydrogen atmosphere for several hours to produce a catalyst useful in the reduction of triple to double bonds. Other useful catalyst systems include cobalt nitrate on charcoal reduced in a hydrogen atmosphere; palladium deposited on barium sulfate; Raney nickel deactivated by zinc acetate, etc. Particularly preferred in the present process for the selective reduction of acetylenic ether nitriles produced as described above, to synthesize the present novel olefins, is a palladium catalyst partly deactivated by lead, as described, e. g., by H. Lindlar (Helvetica Chemica Acta (1952) 35, 446–450). Thus, e. g., palladium dichloride in aqueous hydrochloric acid is stirred with calcium carbonate and the mixture is then shaken with hydrogen. The impregnated calcium carbonate is filtered off and stirred and warmed with aqueous lead acetate to produce a highly selective hydrogenation catalyst. Alternatively, the carrier-free catalyst formed by heating palladium black with lead acetate to take up about 3.0% metallic lead may be used as the hydrogenation catalyst, or palladium deactivated by bismuth or copper may be used.

In carrying out the hydrogenation, mild conditions should be maintained, so as to avoid undesired side reactions. Thus, relatively low hydrogen pressures should be applied in the reactor, and addition of hydrogen stopped after entry of the calculated molar equivalent. Preferably, the acetylenic ether nitrile is dissolved or suspended in a hydrocarbon solvent during the hydrogenation; suitable solvents for this step are, e. g., petroleum ether, benzene, cyclohexane, etc. The catalyst may be present in amounts of, for example, from 1 to 5% by weight of the ether nitrile. A readily reducible amine, such as a tertiary heterocyclic amine, e. g., quinoline, may be mixed with the nitrile before the hydrogenation, so as to assist in the suppression of undesired side reductions.

The present novel compounds are liquids with a wide range of liquidity and with a high dielectric constant. They have utility for a variety of chemical and agricultural purposes. As chemical intermediates, they possess several reactive positions and can be converted to other useful chemicals, for example, by reaction of the double bond, or by reduction or oxidation of the reactive cyano group. The compounds wherein all of the R's in the above formula are alkyl radicals containing from 9 to 16 carbon atoms can be used as softeners or plasticizers for synthetic rubbers such as styrene-butadiene rubbers. The nitriles wherein the R substituents each represent alkyl radicals of from 1 to 8 carbon atoms, may be used as oil additives, for the improvement of the operating characteristics thereof, especially after treatment with sulfur monochloride whereby their stability is improved. The present olefinic compounds containing cyclic radicals may be utilized as transformer oils. The nitriles of the invention wherein the R substituents in the above formula are selected from hydrogen and alkyl radicals of from 1 to 8 carbon atoms and no more than one R on each carbon atom represents hydrogen are toxicants, and may be used as herbicides, rodent repellents, bactericides, nematocides, etc. The present compounds containing at least one hydrogen on each of the carbon atoms alpha to the olefinic carbon atoms are especially useful as functional fluids.

The invention is illustrated but not limited by the following examples:

Example 1

This example describes the addition of acrylonitrile to an alkenylenediol.

To a 500 ml. four-necked flask provided with a stirrer, thermometer, condenser and dropping funnel were added 115 g. (1.31 moles) of 2-butene-1,4-diol and 1.5 g. of sodium methylate. The mixture was brought to 30° C. and then there were added 142 g. (2.88 moles) of acrylonitrile, dropwise, over 45 minutes. During the addition, the reaction temperature was held at 40–45° C. by intermittent cooling. The mixture was then stirred at room temperature for several hours and then allowed to stand for three days. The reaction mixture was then acidified with aqueous hydrochloric acid, and unreacted acrylonitrile and water removed under vacuum. After removal of 3 grams of liquid boiling up to 130°/0.4 mm., and a colorless material which boiled up to 167°/0.4 mm.

and subsequently solidified to a white solid, there were obtained 236 g. of 3,3'-(2-butenylene-1,4-dioxy)dipropionitrile, B. 167°/0.4–177° C./0.5 mm., $n_D^{25}$ 1.4647. This was a 92.9% yield of the product based on the butenediol used. A few grams of dark, tarry material, probably polymerized acrylonitrile, remained in the flask.

*Example 2*

Similarly, a 1,4-didodecyl-2-butene-1,4-diol is prepared by hydrogenation of the reaction product of acetylene and an Oxo reaction $C_{13}$ aldehyde. By a procedure as described above, the diol is reacted with acrylonitrile in dioxane in the presence of a catalytic amount of Triton B (a commercially available quaternary ammonium salt reputed to be benzyl trimethyl ammonium hydroxide). There is obtained 3,3'-(1,4-didodecyl-2-butenylene-1,4-dioxy)dipropionitrile.

*Example 3*

This example describes the addition of acrylonitrile to an acetylenic diol.

To a solution of 28.4 g. (0.2 mole) of 2,5-dimethyl-3-hexyene-2,5-diol in 50 g. of ether was added 0.6 g. of sodium. The mixture was stirred at reflux for 30 minutes and then 21.2 g. (0.4 mole) of acrylonitrile was added dropwise over a period of 20 minutes. To accelerate the reaction, there was then added 0.5 ml. of Triton B. After about one-half hour the reaction became exothermic, and within an hour, the temperature fell off again to room temperature. The mixture was stirred overnight and then filtered, neutralized with hydrochloric acid, and fractionated. After removal of the solvent, there were obtained 9.5 g. of a fraction boiling at 119–121°/0.3 mm. (Fraction I), $n_D^{25}$ 1.4543; and 24.1 g. of a fraction boiling at 149–152°/0.3 mm., $n_D^{25}$ 1.4536 (Fraction II). The material designated as Fraction I represented a monocyanoethylated product, while the second fraction was 3,3'-(2-5-dimethyl-3-hexynylene-2,5-dioxy)dipropionitrile, as shown by the following analysis:

|  | Found | Calculated for $C_{14}H_{20}O_2N_2$ |
|---|---|---|
| Percent C | 67.90 | 67.8 |
| Percent H | 8.19 | 8.11 |
| Percent N | 11.24 | 11.28 |

*Example 4*

This example describes another preparation of 3,3'-(2,5-dimethyl-3-hexynylene-2,5-dioxy)dipropionitrile.

A mixture was prepared containing 284 g. (2.0 moles) of 2,5-dimethyl-3-hexyne-2,5-diol, 300 ml. of dioxane, and 15 ml. of choline. The mixture was heated to 35° C., and another 5 ml. of 50% aqueous choline was added. There was then added to the reaction mixture 265 g. (5.0 moles) of acrylonitrile, over a period of 2 hours, the temperature of the reaction mixture being held at between 35 and 50° C. After all the acrylonitrile had been added, the mixture was heated with stirring to 105° C. for one-half hour, then cooled to about room temperature and the catalyst neutralized with concentrated sulfuric acid. The reaction mixture was distilled under vacuum to remove solvent and unreacted acrylonitrile, and the remaining material was then filtered through an absorbent filter aid. On distillation, there were obtained 191 g. of the monocyanoethyl derivative and 186 g. of the 3,3'-(2,5-dimethyl-3-hexenylene-2,5-dioxy)dipropionitrile.

*Example 5*

By a procedure as described in the above examples, 25.5 g. (0.15 mole) of 3,6-dimethyl-4-octyne-3,6-diol was reacted, in 50 ml. of ether in the presence of 0.4 g. of sodium, with 15.9 g. (0.3 mole) acrylonitrile, with the addition of a catalytic amount of Triton B. On distillation, there were obtained 6.6 g. of the monocyanoethyl derivative, B. 124–130°/0.5 mm., $n_D^{25}$ 1.4570, and 19.8 g. of a fraction boiling at 156–160°/0.5 mm., $n_D^{25}$ 1.4578. Redistillation of the latter fraction yielded 16.7 g. of yellow 3,3'-(3,6-dimethyl-4-octynylene-3,6-dioxy)dipropionitrile, B. 161–2° C./0.5 mm., $n_D^{25}$ 1.4579, analyzing as follows:

|  | Found | Calculated for $C_{16}H_{24}O_2N_2$ |
|---|---|---|
| Percent C | 69.27 | 69.5 |
| Percent H | 8.61 | 8.75 |
| Percent N | 10.17 | 10.12 |

Similarly, by the reaction of 1,1'-ethynylenedicyclohexanol with acrylonitrile in the presence of a basic catalyst, there is obtained 3,3'-(1,1'-ethynylenedicyclohexyloxy)dipropionitrile.

*Example 6*

This example describes the reduction of an acetylenic ether nitrile prepared as described above, to give an olefinic nitrile of the formula of the compounds of the invention.

A hydrogenation catalyst was prepared by the procedure described by H. Lindlar, op. cit., by the reduction of palladium chloride deposited on calcium carbonate with hydrogen, followed by treatment of the palladium-calcium carbonate catalyst with lead acetate. A solution of 124 g. of 3,3'-(2,5-dimethyl-3-hexynylenedioxy)dipropionitrile prepared as described in Example 3, dissolved in 100 ml. of ethanol, was placed in a bomb, and to the bomb was added 25 g. of palladium-lead catalyst. Hydrogen was pressed into the bomb until a molar equivalent had been absorbed by the reaction mixture, as shown by a decrease in pressure. The bomb was vented, and there was isolated, by distillation, after removing the catalyst, 114 g. (91.3%) of 3,3'-(2,5-dimethyl-3-hexenylene-2,5-dioxy)dipropionitrile, B. 160–166° C./0.4 mm., $n_D^{25}$ 1.4659. Infra-red examination showed absorption at 10.35 μ indicative of olefinic unsaturation.

Similarly, by the reduction of the 3,3'-(3,6-dimethyl-4-octynylene-3,6-dioxy)dipropionitrile prepared as described above, with another batch of palladium-lead catalyst, there is prepared 3,3'-(3,6-dimethyl-4-octenylene-3,6-dioxy)dipropionitrile.

*Example 7*

This example describes the evaluation of ether nitriles as functional fluids.

3,3'-(tetramethylenedioxy)dipropionitrile was prepared by the reaction of 1,4-butanediol with acrylonitrile. This material was found to have the following properties:

Specific gravity, 25/25° C _____ 1.023
Viscosity at 210° F., centistokes _____ 2.77
Viscosity at 100° F., centistokes _____ 11.48
Viscosity index _____ +89
Pour point, °F _____ +85

It will be seen from the above data that the saturated 3,3'-(tetramethylenedioxy)dipropionitrile solidifies at a high temperature, i. e., +85° F., and is thus of no utility for functional fluids which must operate at low temperatures, or even under normal winter operating temperatures.

The same characteristics were now measured for the 3,3'-(2-butenylene-1,4-dioxy)dipropionitrile of Example 1. It was found to have the following properties:

Specific gravity, 25/25° C _____ 1.058
Viscosity at 210° F., centistokes _____ 2.59
Viscosity at 100° F., centistokes _____ 9.81
Viscosity —40° F., centistokes _____ 3870
Viscosity index _____ +106
Pour point, °F _____ >—70

In contrast to the properties of the saturated homolog, the present 3,3'-(2-butenylene-1,4-dioxy)dipropionitrile remains liquid over a wide range of temperatures and is still pourable down to extremely low temperatures. It is thus suitable for use, for example, in the hydraulic systems of air craft and in other installations utilizing functional fluids which must be effective over a wide temperature range down to very low temperatures and remain fluid at these temperatures.

Other (alkenylenedioxy)dipropionitriles which may be used as functional fluids for low temperature operation in accordance with the invention include, e. g., 3,3'-(2,5-dimethyl - 3 - hexenylene-2,5 - dioxy)dipropionitrile, 3,3'-(1,4 - didodecyl - 2 - butenylene-1,4-dioxy)dipropionitrile, 3,3'-(1,1'-vinylenedicyclohexyloxy)dipropionitrile, etc.

In utilizing the present olefinic ether nitriles as functional fluids, there may be added thereto, for example, oiliness agents such as oil-soluble metal soaps; viscosity index improvers such as polymethacrylates, polyisobutenes, alkylated polystyrenes, etc.; corrosion inhibitors, such as organic amines; flammability depressors such as triaryl phosphates, etc. They can also be utilized in combination with one or more other functional fluid bases, such as silicates, e. g., tetra(2-ethylhexyl) orthosilicate; hexaalkoxy disiloxanes, e. g., hexa (2-ethylbutyl)disiloxane; phosphate esters, e. g., tricresyl phosphate; mineral oil functional fluid bases, etc., wherein the present dipropionitriles comprise either a major or a minor proportion of the mixture.

The present compounds may also be used as heat transfer agents, for example, as refrigerator fluids or as radiator fluids for internal combustion engines. They may be utilized at temperatures above their boiling points by employing a closed system, whereby superatmospheric pressures are produced. The dipropionitriles of the invention, or mixtures thereof with modifiers or other functional fluid bases as listed above, may also be used as lubricants, as liquid materials in the filters of air conditioning systems, etc. Other modifications and variations of the utilization of the compounds of this invention will readily occur to those skilled in the art.

Hereinabove, I have illustrated details on the compounds, reactions, and utilization of this invention in various particulars. This material is intended to be illustrative and not limiting. All variations and embodiments within the scope of the present specification or in the present claims are comprehended.

What I claim is:

1. 3,3'-(alkenylenedioxy)dipropionitriles of the formula

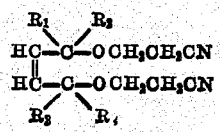

wherein $R_1$, $R_2$, $R_3$, and $R_4$ taken separately are selected from the class consisting of hydrogen and hydrocarbon radicals free of non-benzenoid unsaturation and containing from 1 to 16 carbon atoms, and wherein $R_1$ and $R_2$ taken together and $R_3$ and $R_4$ taken together represent, together with the carbon atom to which they are attached, a saturated carbocyclic radical containing from 5 to 10 carbon atoms.

2. 3,3'-(alkenylenedioxy)dipropionitriles of the formula

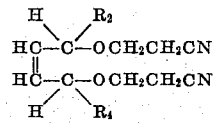

wherein $R_2$ and $R_4$ are hydrocarbon radicals free of non-benzenoid unsaturation and containing from 1 to 16 carbon atoms.

3. 3,3'-(alkenylenedioxy)dipropionitriles of the formula

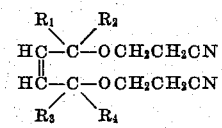

wherein each R represents a hydrocarbon radical free of non-benzenoid unsaturation and containing from 1 to 16 carbon atoms.

4. 3,3'-(alkenylenedioxy)dipropionitriles of the formula

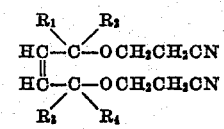

wherein each R represents an alkyl radical of from 1 to 16 carbon atoms.

5. 3,3'-(2-butenylene-1,4-dioxy)dipropionitrile.

6. 3,3' - (2,5-dimethyl-3-hexenylene-2,5-dioxy)dipropionitrile.

References Cited in the file of this patent
UNITED STATES PATENTS

| | | |
|---|---|---|
| 2,437,905 | Bruson | Mar. 16, 1948 |
| 2,445,652 | Whetstone | July 20, 1948 |
| 2,579,580 | Howk et al. | Dec. 25, 1951 |

UNITED STATES PATENT OFFICE
Certificate of Correction

Patent No. 2,836,613 May 27, 1958

Samuel Allen Heininger

It is hereby certified that error appears in the printed specification of the above numbered patent requiring correction and that the said Letters Patent should read as corrected below.

In the heading to the printed specification, line 2, the title of the invention should appear as shown below instead of as in the patent—

3,3'-(ALKENYLENEDIOXY)DIPROPIONITRILES in the printed specification, column 3, lines 28 to 33, the right-hand portion of the equation should appear as shown below instead of as in the patent—

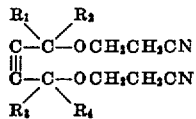

Signed and sealed this 4th day of November 1958.

[SEAL]

Attest:
KARL H. AXLINE,
*Attesting Officer.*

ROBERT C. WATSON,
*Commissioner of Patents.*